I. C. TAYLOR.
GAS PRESSURE REGULATOR.
APPLICATION FILED OCT. 6, 1920.

1,411,228.

Patented Mar. 28, 1922.
2 SHEETS—SHEET 2.

Isaac C. Taylor
INVENTOR.

Witness

BY
Norman J. Whitaker
ATTORNEY.

UNITED STATES PATENT OFFICE.

ISAAC C. TAYLOR, OF QUINTON, OKLAHOMA.

GAS-PRESSURE REGULATOR.

1,411,228.  Specification of Letters Patent.  Patented Mar. 28, 1922.

Application filed October 6, 1920. Serial No. 415,003.

*To all whom it may concern:*

Be it known that I, ISAAC C. TAYLOR, a citizen of the United States, and a resident of Quinton, in the county of Pittsburg and State of Oklahoma, have invented a new and useful Gas-Pressure Regulator, of which the following is a specification.

My invention relates to gas pressure regulators and its principal object resides in the provision of a mechanism wherein the gas pressure to the gas meter may be regulated and which will automatically cut off the supply of gas to the meter upon the pressure therein exceeding a predetermined degree, upon the decrease of the pressure within the gas meter to normal, communication between the meter and service pipe being again established.

A further object of the invention is to provide a gas pressure regulator embodying a weighted flexible diaphragm operatively connected with a lever carrying at one end a valve for controlling the inlet to the meter and a novel support which normally supports the opposite end of the lever to relieve the flexible diaphragm from strain.

It is another object of the invention to provide a gas pressure regulator that may be quickly and readily adjusted to permit the desired pressure to flow to the meter.

The invention also provides a mechanism employing a pivoted lever carrying a control valve to regulate the passage of gas through the meter, the lever being mounted in a novel manner so that the same together with the other parts attached thereto can be removed from the meter.

With the preceding and other objects and advantages in mind, the invention consists in the novel combination of elements, constructions and arrangement of parts and operations to be hereinafter specified, claimed and illustrated in the accompanying drawings, wherein:

Figure 4 is a detail sectional view showing the pivot mounting for the pivoted lever embodied in the invention;

Figure 5 is a fragmentary detail view of the upper part of the casing and the lever supporting bracket embodied in the invention on a reduced scale.

Figure 1:
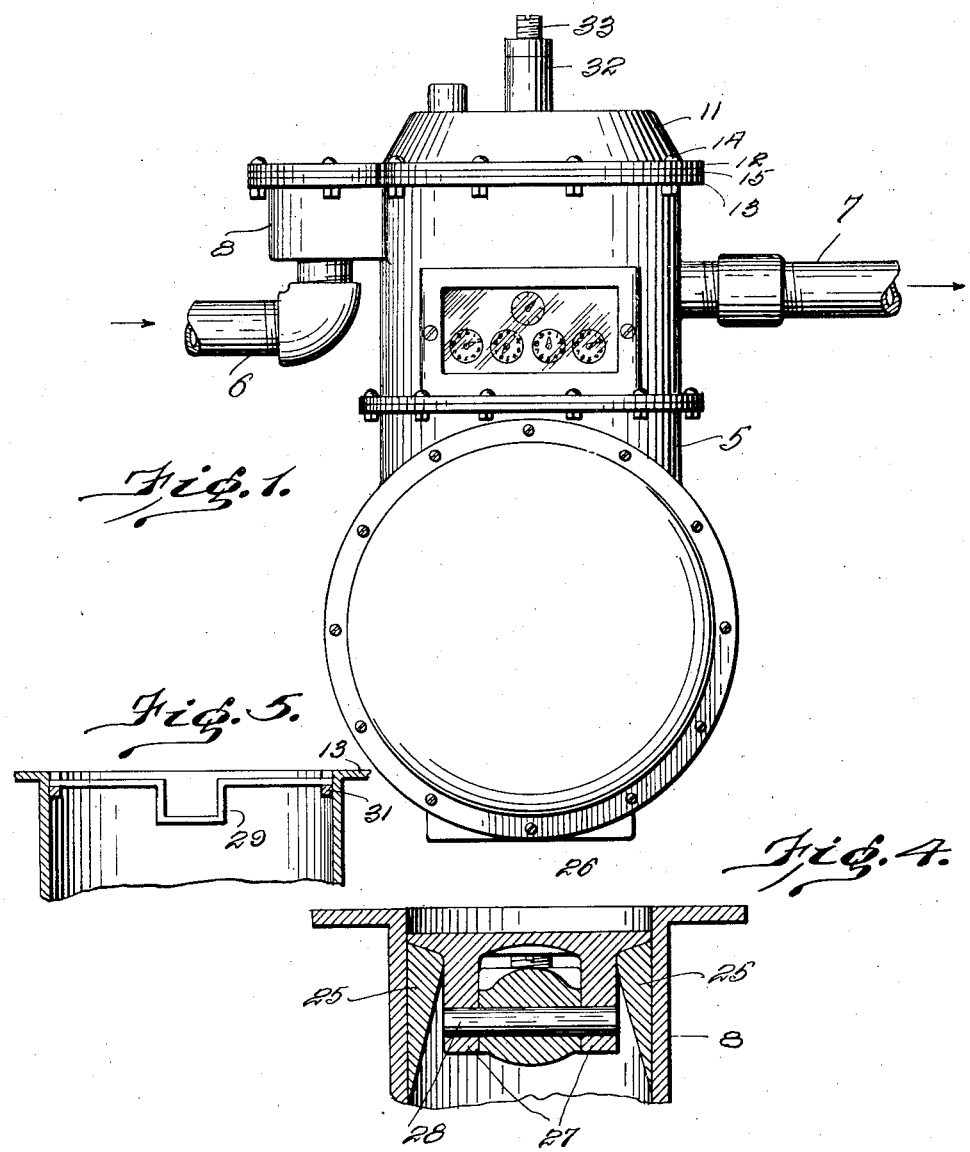
Figure 1 is an elevation of a gas meter constructed in accordance with my invention.
Figure 2:
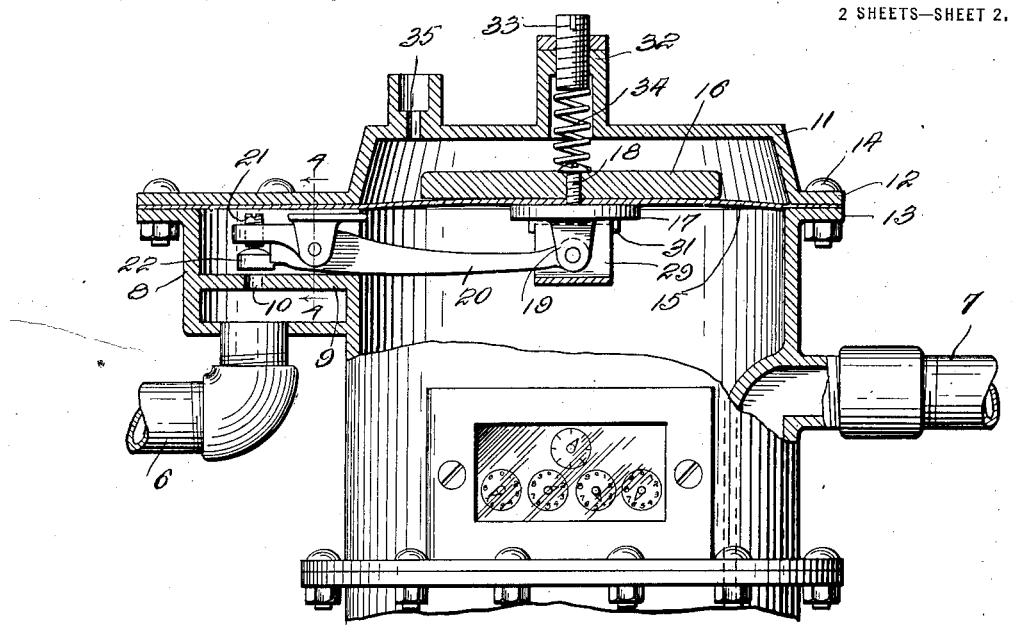
Figure 2 is a fragmentary view partly in section and partly in elevation.
Figure 6:
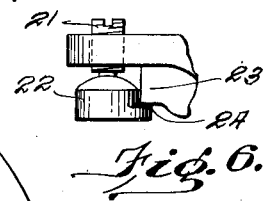
Figure 6 is a detail view of the control valve.
Figure 3:
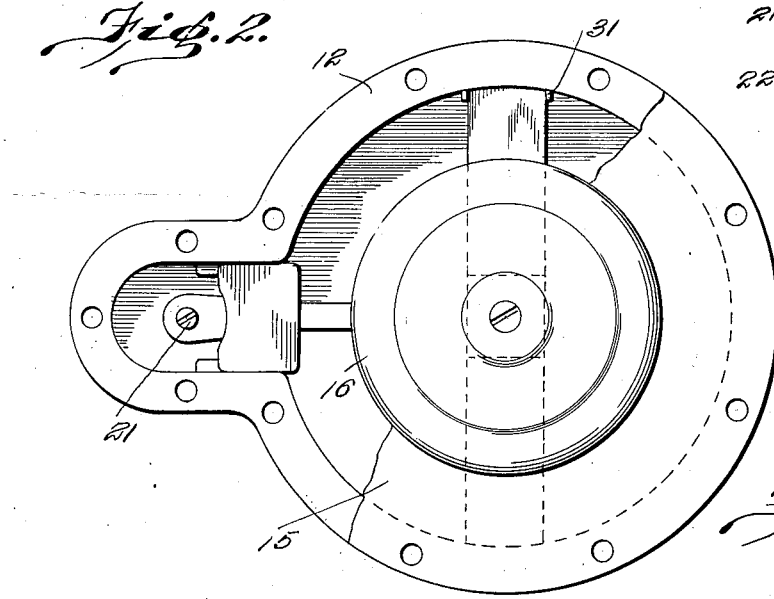
Figure 3 is a top plan view of the meter having its top removed and parts broken away.

Referring in detail to the drawings wherein similar characters of reference designate corresponding parts throughout the several views, the numeral 5 designates a conventional type of gas meter having an inlet pipe 6 and an outlet pipe 7. Formed at the upper end of the meter 5 is a laterally disposed chamber 8 which includes a horizontal wall 9 having an inlet port 10, the chamber 8 being in communication with the inlet pipe 6. The numeral 11 designates a raised top for the meter and is provided with an annular flange 12 at its lower end which rests upon a similar flange 13 at the upper end of the meter 5 and is secured thereto by bolts or other fastenings 14.

Extending entirely across the meter 5 at its upper end and having its edges held between the flanges 12 and 13 is a rubber or other flexible diaphragm 15. Resting upon the diaphragm 15 is a circular weight 16 and disposed at the opposite face of the diaphragm 15 is a plate 17. Passing centrally through the weight 16 and engaged with the plate 17 is a screw 18. The plate 17 is provided with a pair of depending ears 19 to which one end of a lever 20 is pivoted. This lever 20 extends within the chamber 8 and carries a regulating screw 21 having a valve 22 swiveled to its lower end, the latter being disposed over the inlet port 10. This valve 22 is provided with a notch 23 at one edge in which an outstanding lug 24 formed on the lever 20 is engaged to retain this valve against rotation while the screw 21 is being adjusted. Secured to the inner face of the opposite side walls of the chamber 8 and disposed in transverse alignment are outstanding shoulders or supporting members 25 having their upper faces inclined downwardly from the side walls.

Disposed in the chamber 8 and resting upon the shoulders 25 is a plate 26 beveled upon its under face at its opposite longitudinal edges to coincide with the inclined faces of the shoulders 25. This plate 26 is formed with a pair of depending ears 27 between which the lever 20 is disposed. A pivot 28 extends transversely through the ears 27 and lever 20 to pivotally support the latter.

In order to relieve the diaphragm 15 from strain, there is provided a supporting bracket 29 having a U-shaped part 30 intermediate its ends that normally supports the ears 19 on the plate 17. The ends of this supporting bracket 29 rest upon shoulders or brackets 31 formed upon the side walls of the meter 5 at diametrically opposite points.

The top 11 is provided with a central upstanding sleeve 32 in which an adjusting screw 33 is mounted. An expansible coil spring 34 is accommodated within this sleeve 32 and has one end positioned against the weight 16. It will be seen that the tension of this spring 34 may be varied by adjusting the screw 33. A vent opening 35 is also provided for the top 11.

In operation the screw 21 is adjusted and the screw 33 adjusted for the valve to be closed at a predetermined pressure. Should the gas pressure flowing into the meter be sufficient to lift the diaphragm 15, the lever 20 will be rocked to lower the valve 22 to close the opening 10. As long as the pressure is sufficient to lift the diaphragm 15, the valve 22 will be held in closed position, but just as soon as the pressure drops sufficiently to permit the diaphragm 15 to fall, the valve 22 will be moved to open position to permit the gas to again flow through the meter. When the gas pressure falls sufficiently low the diaphragm 15 moves downwardly until the ears 19 rest in the U-shaped part 30 of the bracket 29.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with a gas meter having an inlet and an outlet, of a weighted diaphragm supported at the upper end of the meter, regulating means normally urging the same downwardly, a lever having one end pivotally connected with the diaphragm and its opposite end pivoted to one side of the meter, the latter end carrying a valve controlling the inlet opening, and a bracket in the meter and normally supporting the pivotal connection between the lever and diaphragm to relieve the latter from strain.

2. In a pressure regulator, a casing having a chamber at one side having communication with the pressure supply and the interior of the casing and also provided with an inlet port, a diaphragm disposed across the casing at its upper end, means normally holding the same down and adapted to be raised upon the gas pressure reaching a predetermined degree in the casing, outstanding shoulders formed upon the side walls of the chamber, a plate resting thereon, ears depending from the plate, a lever pivoted intermediate its ends between the ears, a valve carried by one end thereof and normally adapted to control the inlet opening and its opposite end pivotally connected with the diaphragm.

3. A pressure regulator comprising a casing having a pressure inlet, a weighted diaphragm extending across the casing, a horizontal lever pivotally connected with the under face of the diaphragm and having its opposite end pivotally supported to one side of the casing, a valve carried by said end for controlling the inlet opening, a horizonal bracket supported in the casing and having a U-shaped part upon which the pivotal connection between the diaphragm and the lever normally rests to relieve the diaphragm of strain.

ISAAC C. TAYLOR.